May 2, 1967
C. B. MARETZO
3,317,222
INSERT CONSTRUCTIONS FOR TUBES OF HEAT
EXCHANGERS AND CONDENSERS
Filed April 16, 1964
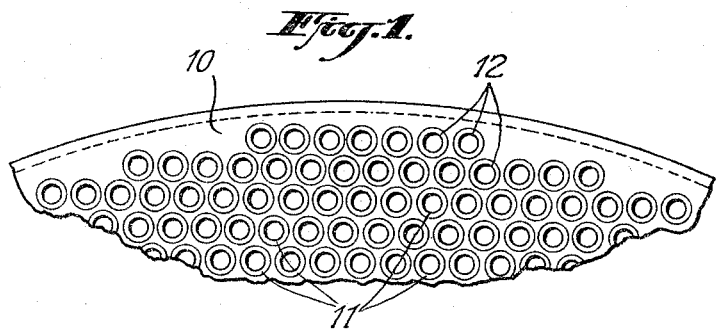
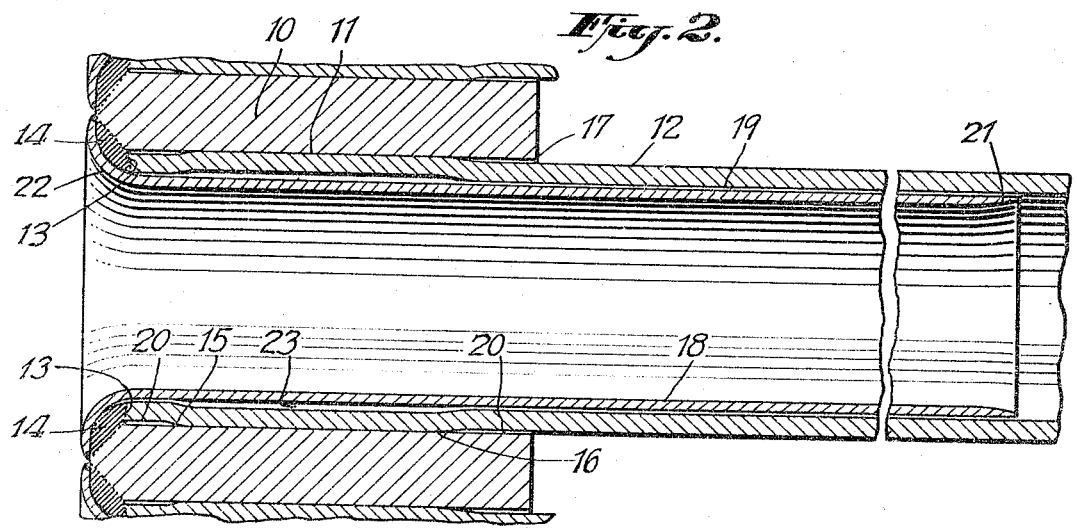
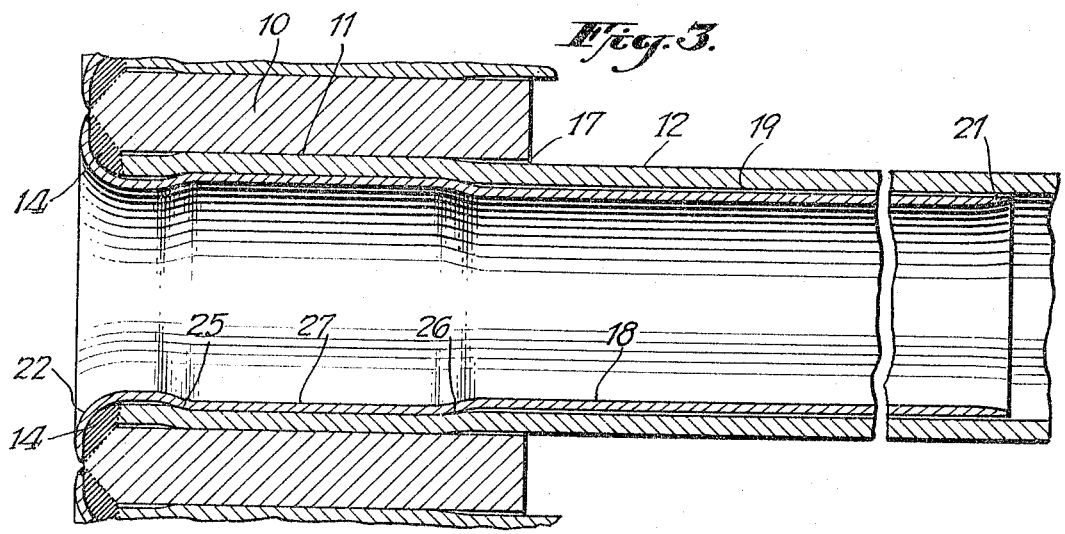

United States Patent Office 3,317,222
Patented May 2, 1967

3,317,222
INSERT CONSTRUCTIONS FOR TUBES OF HEAT EXCHANGERS AND CONDENSERS
Charles B. Maretzo, Brooklyn, N.Y., assignor to Consolidated Edison Company of New York, Inc., New York, N.Y., a corporation of New York
Filed Apr. 16, 1964, Ser. No. 360,275
1 Claim. (Cl. 285—55)

This invention relates to insert constructions for tubes of heat exchangers and condensers, such inserts being for the purpose of protecting against deterioration the end portions of the tubes and the portions adjacent thereto, as well as the regions where the tube end portions are welded to the tube sheet.

Tube failures in tubular heat exchangers, particularly condensers associated with steam tubines in large power plants, have for many years presented a serious problem. This problem has in recent times become more serious, because such failures necessitate shutting down for tube replacements or repairs the operation of equipment costing many millions of dollars. Also, some typical large power plant condensers may have as many as fifty thousand tubes, so that any expedient for remedying the failures which occur in such large numbers of tubes, must necessarily be as inexpensive, simple and reliable as possible. Assuming that the tubes are satisfactorily formed of high quality metal, by far the larger percentage of the tube failures are prone to occur either at the ends of the tubes or within a distance of some six inches inwardly from the ends. Such failures arise from forceful impingement of swirling water containing sediment and bubbles of air or other gases, or combinations of these causes, which are very pronounced in the regions at and near the ends of the tubes and at the regions of the welds, where same are welded to the tube plates.

For many years attempts have been made to remedy these difficulties by the use of inserts within the ends of the tubes and formed of various metals, plastics and other compositions. Many attempts have been made to secure such inserts in place such as by using various types of cement, fiber composition locking rings and coatings covering the inserts for engaging the interior of the tubes. It has been found, however, that if attempts are made to cement the inserts into place, they tend to become loose or back out of the tube to some extent, or even entirely, whereupon the swirling destructive conditions are intensified. It has also been found that composition fiber rings for retaining the inserts in place tend to swell when wet and to contract when dry, so that they become incapable of properly holding the inserts in place and permit the insert to undergo longitudinal motion and protrude from the tube sheet. This difficulty has become more serious than in the past because of the present general practice of welding the tube ends to the tube sheet so that any backing out of the inserts promotes hydraulic turbulence in the space between the protruding end of the insert and the tube weld, thus promoting deterioration and leakage at the weld and consequent necessity of shutting down the equipment. Such tubular inserts heretofore used have also in some cases, particularly with inserts formed of plastic materials, encountered the difficulty that it is not possible adequately to secure the inserts against fluttering and vibration, and consequently enhancing conditions causing deterioration of the adjacent tube metal portions.

The present invention has been found to provide a quite simple, inexpensive and exceedingly dependable means for overcoming these difficulties. In accordance with this invention, a metal tube insert is provided of a length extending inwardly of the tube wall beyond the inner surface of the tube plate, this insert having an external diameter only slightly less than the internal diameter of the tube, the sheet metal of the insert being of a uniform thickness and the diameters internally and externally initially being uniform, except that at the outer end, an outwardly flared annular lip is provided of a shape and size to conform to and cover the annular rounded weld formation by which the outer end of the tube is welded to the tube sheet. After such insert is put into place in a tube, it has been found possible securely and permanently to retain same in place by inserting therein any suitable known form of expander, which by rolling action expands the insert into firm engagement with the interior wall surface of the tube, preferably where, as by known methods, the tube has been expanded into firm engagement with the interior wall surface of the aperture within the tube plate. That is, the insert is expanded uniformly over a distance extending from a point preferably somewhat inwardly of the point where the tube end is welded, to a point spaced somewhat outwardly from the inner face of the tube plate and for reasons which will be hereinafter fully explained.

Reference will now be had to the annexed drawings for a more detailed description of the invention in its various aspects wherein:

FIG. 1 is a view with portions broken away showing the outer face of a portion of a tube sheet or plate in a large condenser or the like;

FIG. 2 is a vertical sectional view of the end portions of one of the tubes as mounted in place in the tube plate and with a tube insert also shown therein in its condition prior to expanding portions of the insert for securing same in place; and FIG. 3 is a view similar to FIG. 2, but showing the insert after portions thereof have been expanded and thus secured in place.

Referring now to the drawings in further detail, FIG. 1 shows the upper portions of the face of a condenser tube plate 10 which has a multiplicity of apertures as at 11 for receiving tubes, and in several of these apertures, as at 12, tubes have been inserted and their ends welded in place, as will be hereinafter further described.

As shown in FIG. 2, one of the tubes 12 has been inserted in one of the tube plate apertures 11 and the outer end 13 of the tube has been secured by a weld 14 to the tube plate 10 by an annularly-extending weld, the outer surface of which preferably conforms to a smooth curvature extending from the inner surface of the tube around to the outer or face surface of the tube plate. In recent times it has become quite common practice to secure the ends of the tubes to the tube plates by welds formed in this manner. Condenser tubing is now customarily formed with quite accurate external and internal dimensions and so that the external surface of the tube end portion will readily slide with close clearance into the apertures such as at 11 and to further secure the tube end in place against vibration, the tube metal is preferably expanded somewhat over a cylindrical portion or region extending as shown from the point inwardly of the weld, such as indicated at 15, and back to a point, such as indicated at 16, spaced outwardly somewhat from the corner formation at 17 at the inner end of the aperture 11. Such expansion ordinarily need not amount to more than several thousandths of an inch in order tightly to secure the tube in place in the plate.

As further shown in FIG. 2, a tubular metal insert 18 has been inserted, this insert preferably having a uniform wall thickness and an external diameter such that it may be easily slid into place. Preferably the tubing and the inserts are manufactured with such accurate diameters that the clearance between the insert and the tubing will be only several thousandths of an inch, for example 3 mils. This clearance (shown somewhat exaggerated, as are all of the other clearances in FIGS. 2 and 3) is indicated at 19. Any noticeable clearance which initially occurs between the exterior wall of the surface of the tube and the interior surface of the tube plate aperture is indicated at 20.

The insert 18 as shown may for example have a uniform wall thickness somewhat less than that of the tube and should extend to a length inwardly of the tube considerably beyond the inner face of the tube plate. In a typical case where the internal diameter of the tube may be about ¾", the insert may extend back in from the end of the tube for a distance of about 6". Preferably the interior wall surface of the insert, at its inner end, is tapered outwardly somewhat, as indicated at 21, to promote conditions of smooth flow for the liquid passing from the insert and beyond into the tube. The outer end of the insert is outwardly flared with an annular, smoothly-curved lip formation, as indicated at 22, shaped to conform closely to the exterior curvature of the weld 14.

The tube having preferably been expanded between points indicated at 15 and 16, there will be a clearance space 23 between the insert and the interior surface of the tube. This clearance space (although shown somewhat exaggerated for clearness in FIG. 2) will initially be somewhat greater than the clearance space 19. Now, firmly to secure the insert in place, a suitable known form of rolling expanding device may be inserted to expand a smooth cylindrical portion of same (as shown in FIG. 3) from a point such as indicated at 25, back to a point such as indicated at 26, this expansion being first made sufficient to eliminate any such clearance space as indicated at 23 in FIG. 2, and whether or not the tube has been expanded at this region, as above described, the insert, after being expanded firmly to engage the inside of the tube, is preferably expanded somewhat further, for example by about .002" to insure that between the points 25, 26 the insert will be tightly and securely lodged in place and in effect locked against displacement and with the lip portion 22 firmly engaging and covering the weld 14. As shown, the cylindrical expanded portion smoothly merges with the non-expanded adjacent portions.

By terminating the expansion of the insert at a point such as indicated at 25 spaced somewhat from the weld 14, any possibility of weakening or subjecting the weld to stresses during such expansion, will be avoided. Also, by terminating the expansion of the insert at a point such as indicated at 26, spaced outwardly from the corner configuration 17 of the plate aperture, will insure that the tube will not be caused to be expanded and subjected to stress at such corner. Any such stresses would tend to aid or promote deterioration of the tube metal at that location. In typical large condensers, the steam contained therein and surrounding the tubes, may include some ammonia arising from amine treatments of the boiler water and it is believed that this will tend to promote deterioration of any such portions of the tube metal as may be exposed thereto and which are subject to localized stresses or distortion of the metal.

The inserts 18 may preferably be formed of the same metal as the tubes 12 and the tube plate 10, for example in typical cases aluminum-bronze alloys may be used.

The construction as above described has a combination of advantages which conjointly contribute to a surprising degree to prolonged freedom from tube failures. That is, the flared cap portion 22 of the tube insert is such as fully to protect and cover the weld, while the insert is expanded into tight engagement with the tube at a point starting from a point spaced from the weld and extending to a point spaced from the corner formation 17 of the inner face of the tube plate. This tightly-engaging expanded length 27 has been found adequate to protect the weld 14 against the variety of high frequency vibrations which occur in large condensers and at the same time the expanded area is sufficient to hold the inner portions of the insert against relative vibration with respect to the tube, such as would promote deterioration of the tubing. Furthermore, the expanded region 27 securely holds the insert against migration outwardly, which has heretofore been a serious problem with such inserts, due to vibration conditions and due furthermore to small pockets of air which occur between the insert and the tube, and which appear to cause the insert to tend to be forcefully ejected, because at times there may be as much as a 20" vacuum in the space at the face of the tube plate, as compared with the pressure in small air pockets between the inserts and the tubes.

What is claimed and desired to be secured by Letters Patent is:

In combination: a tube sheet having numerous tube apertures and adapted for use in steam turbine condensers and the like heat exchangers; water tubes having their end portions received in said apertures and having normal external diameters such as to provide close clearance with the interior surfaces in the apertures, means affixing the ends of said tubes to the tube sheet, said tube ends terminating near the face of the tube sheet, each of said tubes being expanded to form a cylindrical expanded portion thereof which is in tightly-fitting engagement with the interior surfaces of the apertures from point at the region of the front face of the tube sheet and extending back to points near, but spaced inwardly from the rear face of the tube sheet; and tubular inserts formed of sheet metal of uniform thickness and located within the end portions of each of said tubes, each said insert at its outer end having an annular outwardly flared lip portion covering the end of its corresponding tube and the affixing means, each said insert extending inwardly of the tube for a distance of at least several inches beyond the rear face of the tube sheet and having an external diameter such as to be received with close clearance within the tube, each said insert also being expanded to form a cylindrical uniformly-expanded portion thereof which is in tightly-fitting engagement with substantially the entire expanded portion of the tube, the expansion of said expanded portion of the insert being no more than several mils, and the interior surface of said expanded portion of the insert merging smoothly with the adjacent interior surfaces of the insert.

References Cited by the Examiner

UNITED STATES PATENTS

| | | | |
|---|---|---|---|
| 1,102,163 | 6/1914 | Opperud | 285—214 |
| 1,220,438 | 3/1917 | McKenna | 285—213 |
| 1,252,585 | 1/1918 | Kinnane | 285—213 |
| 2,150,361 | 3/1939 | Chobert | 285—222 |
| 2,310,927 | 2/1943 | Bay | 285—213 |
| 2,735,698 | 2/1956 | Brinen | 285—222 |
| 2,785,459 | 3/1957 | Carpenter | 285—222 |

OTHER REFERENCES

"Alkaserts" Plastic Inserts for Steam Condenser Tubes, Tennant Development Corp., August 1958.

CARL W. TOMLIN, *Primary Examiner.*

R. GIANGIORGI, D. AROLA, *Assistant Examiners.*